Dec. 3, 1946.   J. E. RUDY ET AL   2,412,065
ELECTRIC WELDING WITH PORTABLE FLUX BOX
Filed June 4, 1943
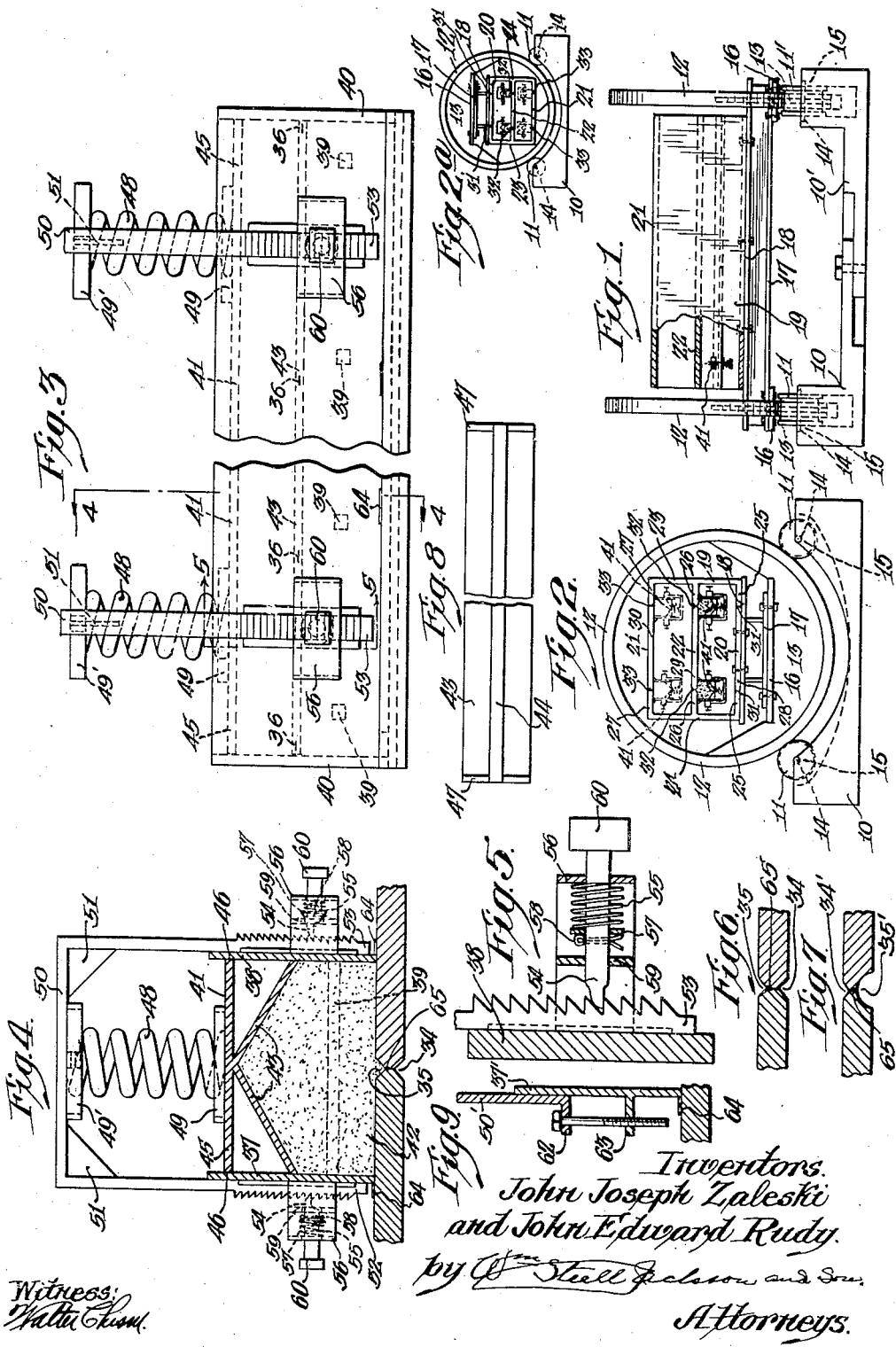
Inventors.
John Joseph Zaleski
and John Edward Rudy.

Patented Dec. 3, 1946

2,412,065

UNITED STATES PATENT OFFICE 2,412,065

ELECTRIC WELDING WITH PORTABLE FLUX BOX

John Edward Rudy and John Joseph Zaleski, Coatesville, Pa.

Application June 4, 1943, Serial No. 489,682

11 Claims. (Cl. 219—10)

Our invention relates to a method of electrically welding materials with portable flux boxes.

In normal welding of parts where one side of the weld is freely accessible from the outside, the parts to be welded are rested at the intended joint in a bed of flux so that the flux of the bed forms a stop or dam against undue flow of molten metal through the intended joint while the first weld is being placed.

In welding two plates in line, for example, with edges in contact which are to be welded together, it is highly desirable and is customary to chamfer the abutting edges of the plates so that on each side the chamfers of the two plates together make a welding groove within which the start of the weld takes place. As a result of this chamfering the butts of the welding plates, i. e., the sections abutting at the start of the weld, constitute but a third or a fourth of the entire thickness of each plate, and the rest of the thickness at the joint is built up from welding electrodes.

When welding is started the abutting edges of the plates are held together as by a tacking weld applied at intervals by an assembler and the plates at the joint are supported along their accessible sides upon such a bed of finely divided flux during welding. The side of the weld away from the bed is welded first and the opposite side is welded subsequently.

The flux bed acts as a dam and also tends to cool the molten metal, from both standpoints, therefore, protecting against burning through. No such means is available for protecting against burning through where neither side of the joint can be pressed against a flux bed.

Whether welding be done by an automatic welding machine or by hand welding, the amperage of current which can be passed through the welding electrode is limited by the amount of heat which can be developed at any particular part of the joint without such deep penetration and over so large an area as to cause molten metal of the plates or electrodes to flow through the joint and leave a hole.

Whenever a weld is closed with a pocket of air, slag or other impurity trapped within it, where the joint is to be tested by X-ray, the joint is shown up by the X-ray and must be repaired and again X-rayed. This involves a lot of additional and special work upon a weld which should have been finished at the first complete operation. The initial welding may have been capable of being done by automatic machine welding at the start, but this patchwork to make good imperfections in the original welding must be done by hand.

Defects in welding occur, of course, from many different causes but the major cause of trouble lies in lack of proper penetration of the first or initial weld made, i. e., the first side or face of the joint welded.

If unlimited heat could be applied, i. e., if as much amperage as the welder desired could always be used, there would be few rejections of welds, but with the danger of burning through, it is not safe for the welder to use much current and he cannot get sufficient heat at the bottom of the first weld or a large enough pool of molten metal there to float out impurities, with the result that when the second side or face is welded the impurity which was carried with the stream of molten metal during the first welding operation will be trapped at the bottom and after X-ray detection must be chipped out of the weld, or if of long continuance, deseamed out (burned out with the torch as a hand operation) and a patch must be put in by hand.

If the penetration of the weld from the side first welded be sufficient and the slag and other impurities have been floated out, there is no difficulty when the second side is welded in joining up the second weld with the first to make a single weld as distinguished from two separate welds.

Our invention in effect permits us to apply all of the advantage available under the most favorable circumstances in a bed to many joints which cannot be rested on a bed.

We resiliently press flux against the side opposite the intended weld so that the flux supports against a run of metal, sealing against any undue flow of metal and cooling the weld. Since we can concentrate flux pressure against a narrow line of the work, we are able to get very much more satisfactory continuous pressures and follow-up of pressure than would be available when resting work on a bed.

Inevitably, when work is rested upon a flux bed and initially hammered into the flux of the bed by a mallet, as is customary, the welding operation upon the opposite side or face of the work causes a reduction in volume of the flux within the chamfer beneath it. Because the weight of the work will not sink the entire body of the work into the flux a gap is formed within the chamfer and the flux ceases to press against the walls of the chamfer as it did when inserted.

Not infrequently "dewberries" dropped by the assembler attach to the chamfers. If not warped correspondingly, parts to be welded may leave gaps. These are relieved somewhat where work is rested on a flux bed. Our invention takes care of these better than the bed and in places where the bed cannot be used.

Where the parts to be welded are held together by tacking at intervals, it is customary to weld first the side away from the tacking and when it comes to welding the other side, to cut out the tacking before starting the welding of this second side. The reason for this is that the tacking is ordinarily applied by an assembler who may not be a competent welder and there is danger that the assembler may not have taken the necessary care to make sure that his tacking is applied on clean surfaces.

In some types of welding product, particularly where high pressure or strain, mechanical or fluid, is to be applied to the joint, the requirements for the welded joint are not only severe in the total strength required, but must measure up to high standards from point to point along the entire lengths of the welded joints. The standards and tests for welded joints have been advancing progressively for years and have advanced sharply during the present war emergency.

Resting joints to be welded upon a bed of flux has proved a great help in preventing molten metal at the weld from running through the welded section during the welding of the side first welded. This allows deeper penetration and higher amperage of current through the welding electrode and thus allows a higher lineal speed of welding.

The use of the welding bed has one disadvantage, namely that the flux must be crowded up in the groove on the under side of the intended joint to be welded and may not flow fully in to this groove to fill it uniformly, presenting the difficulty that if at any point the flux does not fill this groove, molten metal from the weld can run down into the space cleft, leaving a hole of the type against which the present invention particularly aims to protect.

There are many locations where the welder cannot make use of a flux bed for the reason that the joint to be welded is not at the surface of the piece to be welded and so cannot be rested upon a bed. The main purpose of this invention is to permit a body of flux to be applied to one side of the joint so as to support against breaking through of the weld metal notwithstanding that the joint cannot be pressed against an upwardly facing bed.

A purpose of our invention is to face the second side of a joint to be welded upwardly, to pour flux into and about the joint while it faces upwardly, to hold the flux in and about the joint, to face this second side of the joint downwardly while the flux is so held and to weld the first side of the joint while the second side is protected by the flux. The flux is preferably pressed against the joint by spring means.

A further purpose is to temporarily attach a flux guide in the form of an open-bottom box to the joint above the second side of the joint to be welded while this side faces upwardly, to pour flux into the guide and within the groove of the joint, to close the bottom of the guide and resiliently press the flux against this second side of the joint, to turn the work, guide and flux upside down to make the first side available for welding and to weld the first side while the flux is being pressed against the joint, subsequently removing the flux and welding the second side.

A further purpose is temporarily to support a hollow flux box upside down about an upwardly facing side of a joint to be welded, to insert flux within the box, filling it into the groove on the side away from the first weld, to resiliently press the flux toward the joint by movement of the bottom of the box to provide "follow-up" for the flux and keep the flux in contact with the walls of the groove of the joint and then turn the work and the temporary flux box upside down and weld through the groove of the joint on the opposite side of the work from the box, using the flux within the groove and the resilient pressure against the flux to maintain the flux in position during the welding operation.

A further purpose is to increase the available welding temperature sufficiently to get rid of all slag or impurities by floating them to the surface of the weld.

A further purpose is to press flux against the work within the sides of a flux box by surfaces tending to press the flux toward the center line of the box at the same time that it urges the flux into and maintains flux in the weld groove opposite to that through which welding is first to take place.

A further purpose is to set a resilient pressure against the flux in a flux box, holding it to its work by spring means and automatically to hold the spring in adjusted position during the welding operation.

A further purpose is to press flux against the opposite side of a joint to the side which is being welded as distinguished from pressing the flux against the joint.

Our invention relates to the methods or processes involved as well as to mechanism by which the methods or processes may be carried out.

We have shown one preferred mechanism in the drawings, with slight modifications, selecting a mechanism which is simple, effective and inexpensive but which, as well as the work shown have been selected primarily because of their excellence in illustrating methods and mechanisms involved.

In the drawing—

Figure 1 is a side elevation of a base ring including a support for work to be welded and a work piece which is to be welded by use of our invention.

Figure 2 is a front elevation of the structure of Figure 1.

Figure 2a is a reduced sectional view corresponding to Figure 2 but in different position.

Figure 3 is a side elevation of a portable flux box which may be used in applying the methods of our invention. Plates to be welded are also shown. Four such boxes are shown to very much reduced scale in Figure 2.

Figure 4 is a section of Figure 3 upon line 4—4.

Figure 5 is a fragmentary enlarged section of a portion of Figure 3 and upon line 5—5.

Figure 6 is a section of the abutting ends of two plates showing grooves within which electric welding is to be effected. The grooves are of a type common when the welding is to be performed by an automatic machine.

Figure 7 is a section similar to Figure 6 but showing grooves in a form common when the welding is to be done by hand.

Figure 8 is a fragmentary top plan view of an alternative pressure bar or member which can be used instead of that in Figure 4.

Figure 9 is a section corresponding generally with Figure 5 but showing an alternative structure.

In the drawing similar numerals indicate like parts.

The base ring comprising the holder in Figures 1 and 2 is old in the art and is used conveniently to manipulate articles to be welded so that they can be swung readily about an axis to place and alter the position of the work for easier access. The ring is made up of main parts shown rather diagrammatically in these figures. These are: base parts 10, 10' carrying rollers 11 and 11', hoops or circular bands 12 turning on the rollers and the work supporting frame 13 carried by the bands. The rollers are supported upon axles 14 within side shells 15.

One set of rollers 11, mounted upon 10, is driven by gearing not shown so that the entire supporting structure may be revolved by turning the gearing. The other rollers 11' are mounted upon frame member 10' slidable longitudinally with respect to the main part 10 of the frame and capable of being fastened to the main part 10 in adjusted position so that the spacing of the pairs of rollers may be varied to accommodate differences in length of the connecting base or frame 13 to suit different sizes of work to be handled.

Within each of the hoops is welded a web 16 which is connected in any suitable way with transverse strips 17. The table 18 is connected between the two transverse strips and extends from one hoop to the next, differing in length according to the work 19 which is to be mounted upon it. It may comprise effectively a mere plate upon which the work 19 to be welded is clamped or a composite support specially suited to receive the work.

The work has been shown as of conduit form because we can show in a conduit joints so placed as well to illustrate the invention and can show welded joints in different positions within the conduit. The conduit presents upper and lower surfaces 20 and 21 and partition 22. The conduit is made up of sides 23 and 24 integral with longitudinally extending inwardly directed webs or fins 25, 26 and 27, and intermediate plates 28, 29 and 30 joining the respective webs on one side to those on the opposite side. They are welded to the webs at 31, 32 and 33 respectively.

For convenience the groove in the face through or at which welding takes place first is called 34 and that through or at which the second welding takes place is 35. In Figure 7 these become 34' and 35'.

The welds at 31 and 33 are within walls which constitute outside conduit walls and the outside faces of these walls at the joints in existing practice can be rested, one face at a time, against the upper surface of a fixed bed of flux, not shown. The inside face of each of these 31 and 33 welds at the groove is normally welded by an automatic welding machine or by hand. In existing practice the inside face is thus the first face welded. The outside face of the joint is then welded, as the second face to be welded, and without need of flux engagement with the opposite side of the weld.

Neither face of the intermediate welds, at 32, can be made while the other face of the weld is rested upon a fixed flux bed, because both weld faces are inside faces and no face of either joint is accessible so that it can be rested upon a fixed flux bed. Each face, therefore, of the welds at 32 offers a good opportunity to exhibit the utility of the present invention.

Though the first face welded, at either 31 or 33, can now be welded while the outside face is rested upon a fixed flux welding bed, indicated above, better results can be secured by welding them using the welding method and portable flux box invented by us.

For the purpose of showing how any of these welds could be made, we have illustrated portable flux boxes for position in use in welding as a first weld the outside faces of joints at position 31. These are welded at and through grooves 34. The inner position for setting the boxes and filling them with flux is shown in Figures 2ª and 4. By removing the conduit from its position as shown in Figure 2, turning it upside down and again clamping it upon the table, the joint positions 33 will keep the same positions as the joint positions 31 now occupied in the conduit as it is placed in Figure 2 and will be equally accessible from the outside.

The boxes are intended to be attached to the work pieces preferably by welding the box sides to the work pieces at opposite sides of the joint, so that the joint will lie between them. The boxes are filled when the parts are in the positions seen in Figures 2ª and 4. In Figures 2 and 2ª four boxes are shown as attached for the reason only that while the base ring is set in one position all four of these can be put in place, saving resetting it.

The box as set initially lacks the movable bottom, the spring and the yoke by which the spring is held in compressed position. It is provided with ends and is filled to the desired height before the bottom spring and yoke are put in place. The joint is tacked at intervals as at 36 to hold it against movement and the flux is poured into the then outwardly facing weld groove 35 or 35' and against the work pieces filling up the box to a height above any braces.

Because both faces of the welds at 31 are spaced from the outside of the conduit, as indicated, so as not to be accessible from the outside, and cannot be rested upon a bed of flux to provide for the protection given by this flux in making the first weld of the joint through grooves 34 on the opposite faces of these joints from the flux, they require different treatment if they are to be given the benefit of flux support for one side of the joint by flux in groove 35 while the opposite side is being welded.

Not only will our flux box and flux give support to inside joints but it will give better flux support to joints at the outside than the normal fixed body of flux gives even to those joints which are accessible on one face of the joint and could be rested upon the table.

The boxes could be used to advantage in making welds 31 or 33 (according to which part of the work is accessible as the work is clamped on the table). There would be special advantage for two reasons; first because they allow the flux to be sifted into the groove 35 of the joint by gravity, and subsequently to be followed up by a mass of flux which is pressed upon the flux already in the groove of the joint by spring pressure; and second because the flux can be applied and held to the joint at the inside of the joint, making the inside groove 35 as in the upper tier of joints 39 in Figure 2, permitting the first faces of the joint welded to be at grooves 34, at the outside of the conduit.

One form of my flux box is shown in Figure 4 where the box side plates 37 and 38 are joined by transverse braces 39 at such intervals and so placed as to maintain the side plates against displacement and against tilting, one with respect to the other, and not high enough in the box so as to interfere with downward movement of the box bottom.

The box is provided with ends of any suitable character shown at 40 and with a bottom unit 41 extending the length of the box.

The bottom unit may form a movable bottom only, by which the flux content 42 of the box can be held to its duty within and about the groove 35, or the edge of the joint if this face be not grooved, or it can be used to perform a further function by concentrating the flux along the middle line of the length of the box so as to use to the best advantage whatever pressure may be required to be exerted upon the face of the joint. In the form illustrated this latter function is effected by a flux-engaging bottom 43 which is concave toward the joint so as to tend to draw the flux away from the sides of the box. As a matter of maximum strength for the weight required, this concaved bottom desirably is made of light material and is re-enforced to add stiffness and prevent bending by a beam 44 which performs the additional function of engaging the insides of the side walls of the box. The beam transmits the pressure which is to be applied and prevents lateral tilting of the guttered bottom member which actually engages the flux.

Two forms of stiffener are shown, the one 42 (Figures 3 and 4), in the form of a plate 45 extending the length of the box, of sufficient thickness to add rigidity to the box bottom 43 and having a width at the ends and permissibly at different points (or the whole of the distance throughout the length of the box) to prevent tilting of the box bottom by engagement of the edges 46 of the plate with the inner faces of the box sides, whatever the height of the beam.

The other stiffener or beam (Figure 8) provides an I beam to secure strength against bending, side guards 47 on both sides and at both ends engage the inside box walls and prevent tilting.

The movable bottom, whether it be flat or downwardly concaved as shown, is pressed inwardly toward the joint and in order that pressure may continue during the welding, notwithstanding readjustment of the positions of the particles of flux, so as to "follow up" the flux within the adjacent groove of the joint, we resiliently press the flux toward the joint. For this purpose we have shown springs 48 near opposite ends of the box, resting in seats 49 and 49'. The seats 49 are mounted upon the movable bottom units and the seats 49' are mounted within inverted yokes 50 braced at 51 (Figures 4 and 5).

Our preferred form of construction, that shown in Figure 4, constructs the free ends of the legs 52 and 53 of the yokes as outwardly facing ratchets which may be shoved down by hand within spaces between the outer sides of the box and the spring pressed latches 54. The latches are pressed resiliently by springs 55 extending between guides 56 and washers 57 held by cotter pins 58. The latches are of noncircular section where they pass through further guides 59.

The reason for the preference for this form of Figures 4 and 5 is that the yokes can be pressed down by hand and fastened automatically. They can be released by pulling outwardly upon the handles 60.

A less convenient but fully effective means of holding the yokes 50' is shown in Figure 9 where bolts 61 pass through flanges 62 upon the legs of the yokes and screw into flanges 63 upon the box sides.

In operation the sides of the box are tacked or otherwise fastened to the work on the side of the joint opposite to that which is first to be welded.

The pressure spring yoke and box bottom unit are not yet in place. The work is turned on the base ring so that the sides of the box project upwardly from the work. Welding flux is poured into the box which fills in and about the upwardly facing groove 35 presented between the box sides and partly fills the sides. The movable box bottom is now put in place, the spring and yoke are adjusted and pressure is brought through the yoke and box bottom upon the flux, not only pressing it tightly against the outer face of the joint but providing a "follow-up" by which the pressure may be maintained notwithstanding settling of the flux.

By turning the base ring until the grooves 34 face upwardly instead of the grooves 35 which have been filled with flux, the groove 34 is now welded in ordinary course. Normally with a groove of the character as shown in Figure 4 this welding would be done by an automatic machine. The base ring is now turned again until the grooves 35 face upwardly, the box and all of the flux is removed from grooves 35. The spaced tackings are chipped out in order that there may be no chance of sealing by the weld over parts of a joint which have not properly been prepared and the second welding is effected within the groove 35. If the welding is to be done by hand a different chamfering may be used, such as that in Figure 7 but the operation is the same. In that event preferably the groove 34' is welded first while the groove 35' is maintained full of flux under pressure.

It will be evident that holding the parts together by tacks—such as 64—forms a very convenient way in which the parts may be held together but that other methods of holding may be employed, depending for the character of clamp or holding device used upon the special convenience in view of the character of structures which are being held together.

It will be evident that tightness of contact between the parts being welded is not quite so essential as where the backing of flux is not present.

It will be evident that no fixed width of box is required but that the side plates of the box can be put close together where the space is narrow, or wider apart where a larger mass of flux is desired and space permits. Furthermore where a right angle joint is being welded or near a right angle, the plates need not be parallel but can conform somewhat to the angle used.

It will be evident also that our invention permits metal at the weld to be made hot enough to give deep penetration and to float the impurities out without danger of burning through the joint.

It will be evident that the particular character of flux used has no part in the present invention since any standard flux will serve the purpose. Fluxes are put out by a number of the larger companies including fluxes put out by the Carbide and Carbon Company. Their flux is put out under the trade name of "Union Melt" flux.

In view of our invention and disclosure variations and modifications to meet individual whim or particular need will doubtless become evident to others skilled in the art, to obtain all or part of the benefits of our invention without copying the structure shown, and we, therefore, claim all such in so far as they fall within the reasonable spirit and scope of our claims.

Having thus described our invention what we claim as new and desire to secure by Letters Patent is:

1. In a method of electrically welding materials capable of being welded, the steps which include chamfering both sides of the metal to be welded at the joint, holding the two parts at the joint firmly in relative position, turning the parts to be welded so that the groove from one chamfer faces upwardly, filling the upwardly facing chamfer groove and the faces adjacent the chamfer with flux, pressing the flux into the chamfer, turning the parts to be welded upside down while maintaining the spacing between the parts and the pressure of the flux into the groove presented by the chamfer which thus is faced downwardly, welding the chamfer then facing upwardly, reversing the parts to face the welded chamfer groove downwardly and electrically welding the groove at the chamfer now facing upwardly to complete the weld.

2. In a method of electrically welding materials capable of being welded, the steps which include chamfering facing sides of the bodies being welded at the edges of the intended joint, bringing the sides toward each other so that the opposite chamfers form a groove, tacking the parts to be welded together by welding at the line at which the facing sides meet to form a temporary joint, holding the tacked joint with the chamfer-formed groove containing the tacks exposed upwardly, filling the groove formed by the chamfers and the immediate neighborhood of the chamfers with flux, pressing the flux into the groove formed at the chamfers, turning the work upside down to expose the joint at the side away from the tacks, electrically welding the tacks from this side, turning the work to bring the flux filled groove at the chamfers up, cutting out the tacking and electrically welding the joint from the chamfered side.

3. In a method of electrically welding materials capable of being welded, the steps which include chamfering facing sides of the bodies being welded at the edges of the intended joint, bringing the sides toward each other so that the opposite chamfers form a groove, tacking the parts to be welded together by welding at the line at which the facing sides meet to form a temporary joint, holding the tacked joint with the groove formed by the chamfers and containing the tacks exposed upwardly, enclosing a space for flux about the exposed chamfer groove, filling the groove at the chamfer and the space adjacent the chamfers with flux, pressing the flux into the groove at the chamfers by pressure against the flux in the space, turning the work upside down to expose the joint at the side away from the enclosed space, electrically welding the joint from this side, turning the work to bring the flux filled groove at the chamfers up, removing the flux and welding the joint from the chamfered side.

4. In a method of electrically welding materials capable of being welded, the steps which include chamfering facing sides of the bodies being welded at the edges of the intended joint, bringing the sides toward each other so that the opposite chamfers form a groove, tacking the parts to be welded together by welding at the line at which the facing sides meet to form a temporary joint, holding the tacked joint with the groove containing the tacks exposed upwardly, enclosing a space about the exposed groove, filling the space at the chamfer with flux, pressing the flux into the groove formed at the chamfers by pressure within the space, turning the work upside down to expose the joint at the side away from the flux chamfer, welding the joint from this side, turning the work to bring the flux filled space at the chamfers up, removing the enclosure, cutting out the tacking and electrically welding the joint from the chamfered side.

5. In a method of electrically welding materials capable of being welded, the steps which include chamfering facing sides of the bodies being welded at the edges of the intended joint, holding the parts in position for welding, with the groove formed by the chamfering exposed upwardly, enclosing the space above and about the upper face of the groove formed by the chamfering, filling the space with flux, pressing the flux against the surface within the groove, turning the work upside down to expose the opposite side of the joint being formed with the enclosed space and the pressure now directed upwardly beneath the joint, electrically welding the joint from this side, turning the work back to bring the enclosed space up, removing the enclosure and welding the second side of the joint.

6. In a method of electrically welding materials capable of being welded, the steps which include holding together the parts to be welded with the second face to be welded exposed upwardly and the face to be welded first facing downwardly, enclosing a space about the second face at the intended joint, pouring flux upon and about the said second face at the joint and within the space, while the second face is exposed upwardly, resiliently pressing the flux against the joint and at the same time turning the work so that said second face is directed downwardly and electrically welding first the opposite face from that which has received the flux while the flux is held against the second face of the joint to be welded.

7. In a method of electrically welding materials adapted to be welded, the steps which include chamfering the edges to be united to form a groove, tacking the parts together at one side at their chamfers, leaving grooves on both sides, placing the work so that the groove where the tacking occurs is exposed upwardly, filling the groove exposed and the surface adjacent to the said groove with flux, bringing resilient pressure to bear upon the flux to crowd it into the groove, turning the work upside down while maintaining pressure upon the flux, electrically welding the adjacent faces of the groove then exposed upwardly, again turning the work upside down, removing the tacking and welding the surfaces at the second groove.

8. In a method of electrically welding materials adapted to be welded, the steps which include grooving the parts to be joined, abutting the parts between the grooves at the weld, holding the parts together in the position in which they are to be welded, with the groove at the second face to be welded facing upwardly, filling the groove and the space adjacent to the groove with flux by gravity feed, resiliently pressing the flux against and about the joint, turning the joint so that the fluxed side faces downwardly while maintaining the pressure of the flux upon and about the joint, and welding the upwardly exposed face and groove of the joint.

9. A method of electrically welding materials adapted to be welded including the following steps: grooving the parts to be joined, abutting the parts between the grooves at the weld, holding the parts together in the position in which they are to be welded, with the groove at the second face to be welded facing upwardly, filling the groove and the space adjacent to the groove with flux by gravity feed, resiliently pressing the flux against and about the joint, turning the joint so that the fluxed side faces downwardly while maintaining the pressure of the flux upon and adjacent to the joint, welding the upwardly exposed face and groove of the joint, turning the joint upside down and welding the second face of the joint.

10. A method of protecting a joint between metal parts capable of being welded from flow of molten metal through it while it is being welded and thus permitting a larger amperage of electric current flow during electric welding of the joint, including the following steps: grooving opposite sides of the parts to be joined in the weld, tacking the welded parts together in condition for welding, filling with flux by gravity that one of the two opposite grooves which is second to be welded, while said second groove faces upwardly, pressing the flux against the joint and into the groove resiliently while the second groove still faces upwardly and holding it resiliently pressed into the groove and at the same time turning the parts of the joint upside down so that the groove at which the weld is first to be made faces upwardly, electrically welding at said upwardly facing groove of the joint while maintaining pressure on the flux and against the joint, turning the second groove of the joint to again face upwardly and electrically welding the joint at the groove which then faces upwardly, the flux having been removed from this groove.

11. The method of electrically welding materials capable of being welded which comprises grooving opposite sides of an intended joint, holding the parts together with the side to be welded facing upwardly, packing the groove thus turned upwardly with flux, maintaining the flux within and on the surface about the groove while the parts to be welded are turned upside down, electrically welding the first groove, again turning the parts upside down and electrically welding the second groove thereby caused to face upwardly.

JOHN EDWARD RUDY.
JOHN JOSEPH ZALESKI.